(12) United States Patent
Bauvir et al.

(10) Patent No.: US 11,761,408 B2
(45) Date of Patent: *Sep. 19, 2023

(54) INTERNAL COMBUSTION ENGINE SYSTEM OPERABLE IN AT LEAST TWO OPERATING MODES

(71) Applicant: VOLVO TRUCK CORPORATION, Gothenburg (SE)

(72) Inventors: Laurent Bauvir, Lyons (FR); Raphael Bost, Vaulx en Velin (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/753,856

(22) PCT Filed: Oct. 23, 2019

(86) PCT No.: PCT/EP2019/078906
§ 371 (c)(1),
(2) Date: Mar. 16, 2022

(87) PCT Pub. No.: WO2021/078379
PCT Pub. Date: Apr. 29, 2021

(65) Prior Publication Data
US 2022/0333560 A1 Oct. 20, 2022

(51) Int. Cl.
*F02M 26/70* (2016.01)
*F02M 26/05* (2016.01)
(Continued)

(52) U.S. Cl.
CPC ............ *F02M 26/70* (2016.02); *F02M 26/05* (2016.02); *F02M 26/16* (2016.02); *F02M 26/19* (2016.02); *F02M 26/21* (2016.02); *F02M 26/71* (2016.02)

(58) Field of Classification Search
CPC ........ F02M 26/04; F02M 26/05; F02M 26/16; F02M 26/19; F02M 26/21; F02M 26/70; F02M 26/71
See application file for complete search history.

(56) References Cited

U.S. PATENT DOCUMENTS 4,303,053 A 12/1981 Etoh et al.
6,023,929 A * 2/2000 Ma ...................... F02D 41/0087
123/481

(Continued)

OTHER PUBLICATIONS

International Search Report and Written Opinion dated Jul. 1, 2020 in corresponding International PCT Application No. PCT/EP2019/078906, 9 pages.

*Primary Examiner* — Logan M Kraft
*Assistant Examiner* — Anthony L Bacon
(74) *Attorney, Agent, or Firm* — Venable LLP; Jeffri A. Kaminski

(57) ABSTRACT

The invention relates to an internal combustion engine system (100), comprising: —an internal combustion engine (2) comprising a cylinder block (3) housing a plurality of cylinders (4), a first intake manifold (6a) connected to a first group of cylinders (4a) a second distinct intake manifold (6b) connected to a second group of cylinders (4b) and a first, respectively a second, exhaust manifold (8a, 8b) for receiving the exhaust gas emitted from the first, respectively the second, group of cylinders (4a, 4b); —an air inlet line (10); —an EGR line (20) connected to the first and second exhaust manifolds (8a, 8b); wherein the internal combustion engine system is operable in at least two operating modes, respectively a normal operating mode in which all cylinders are supplied with fuel and a regeneration operating mode, in which the cylinders of the first group of cylinders (4a) are no longer supplied with fuel, characterized in that: —the system also includes a mixing unit (30) comprising a four-way (Continued)

valve, said four-way valve (30) having a first inlet (31) connected to the EGR line (20), a second inlet (32) connected to the air inlet line (10), a first outlet (33) connected to the first intake manifold (6a) and a second outlet (34) connected to the second intake manifold (6b); —the four-way valve is designed so that, in said normal operating mode, the intake gases supplied to the first intake manifold (6a) and to the second intake manifold (6b) have approximately the same proportion of exhaust gas and so that, in said regeneration operating mode, the intake gas supplied to the first intake manifold (6a) only includes exhaust gas.

13 Claims, 4 Drawing Sheets

(51) Int. Cl.
*F02M 26/16* (2016.01)
*F02M 26/19* (2016.01)
*F02M 26/21* (2016.01)
*F02M 26/71* (2016.01)

(56) References Cited

U.S. PATENT DOCUMENTS

| | | | |
|---|---|---|---|
| 11,512,672 B2* | 11/2022 | Bauvir | F02D 41/0007 |
| 11,536,227 B2* | 12/2022 | Bauvir | F02M 26/19 |
| 2012/0085091 A1* | 4/2012 | Melchior | F02M 26/71 |
| | | | 60/600 |
| 2014/0053549 A1* | 2/2014 | Scholt | F02M 26/71 |
| | | | 60/602 |
| 2015/0260128 A1* | 9/2015 | Roth | F02M 26/14 |
| | | | 123/568.13 |
| 2016/0252055 A1* | 9/2016 | Nair | F02M 26/35 |
| | | | 123/568.12 |
| 2016/0298557 A1* | 10/2016 | Bjurman | F02M 26/43 |
| 2016/0348573 A1 | 12/2016 | Marcinkowski et al. | |
| 2017/0260916 A1* | 9/2017 | Kraemer | F02B 75/20 |

\* cited by examiner

INTERNAL COMBUSTION ENGINE SYSTEM OPERABLE IN AT LEAST TWO OPERATING MODES

CROSS-REFERENCE TO RELATED APPLICATIONS

This application is a U.S. National Stage application of PCT/EP2019/078906, filed Oct. 23, 2019 and published on Apr. 29, 2021, as WO 2021/078379 A1, all of which is hereby incorporated by reference in its entirety.

TECHNICAL FIELD

The invention relates to an internal combustion engine operable in at least two operating modes, respectively a normal operating mode and a regeneration operating mode.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment and passenger cars. The invention may also be used on other transportation means such as ships and boats.

BACKGROUND

For a vehicle internal combustion engine, such as a diesel type engine for a heavy-duty vehicle, an exhaust after treatment system (EATS) is usually provided to reduce emissions, e.g. of nitrogen oxides (NOx). Such a system, which may include units such as a selective catalytic reduction (SCR) converter, requires exhaust gas temperatures that are relatively high in order to provide an efficient emission reduction.

However, measures to reduce fuel consumption may reduce the heat loss from the engine to the EATS. Therefore, particularly at low load operation, cold ambient temperatures, and/or cold start events, the EATS might not get enough heat to operate efficiently.

To increase the temperature of the exhaust gases of an engine and regenerate EATS components, a known solution consists to deactivate some of the engine cylinders. This result in an increase in the amount of fuel sent to the other (active) cylinders to compensate for the decrease in power due to the deactivation of the cylinders and to maintain the same torque. As more fuel is burned, the exhaust gas temperature is automatically higher.

Such a solution has been disclosed in U.S. Pat. No. 4,303,053 and US 2016/0298557.

However, the solution proposed in this prior art leads to add much complexity in the structure of the engine and decrease the free space around the engine, which is a major drawback during the mounting process of the vehicle.

SUMMARY

An object of the invention is to provide an internal combustion engine system operable in at least two operating modes, respectively a normal operating mode and a regeneration operating mode, in which some of the engine cylinders are deactivated, and in which the drawbacks of the known solutions are avoided.

The object is achieved by a system according to claim 1. Thus, the object is achieved by an internal combustion engine system Internal combustion engine system, comprising:

an internal combustion engine comprising a cylinder block housing a plurality of cylinders, a first intake manifold connected to a first group of cylinders, a second distinct intake manifold connected to a second group of cylinders and a first, respectively a second, exhaust manifold for receiving the exhaust gas emitted from the first, respectively the second, group of cylinders;

an air inlet line;

an EGR line connected to the first and second exhaust manifolds;

wherein the internal combustion engine system is operable in at least two operating modes, respectively a normal operating mode in which all cylinders are supplied with fuel and a regeneration operating mode, in which the cylinders of the first group of cylinders are no longer supplied with fuel, characterized in that:

the system also includes a mixing unit comprising a four-way valve, said four-way valve having a first inlet connected to the EGR line, a second inlet connected to the air inlet line, a first outlet connected to the first intake manifold and a second outlet connected to the second intake manifold;

the four-way valve is designed so that, in said normal operating mode, the intake gases supplied to the first intake manifold and to the second intake manifold have approximately the same proportion of exhaust gas and so that, in said regeneration operating mode, the intake gas supplied to the first intake manifold only includes exhaust gas.

Thus configured, the system of the present invention permits to control the flow of fresh air and exhaust gas supplied to the engine cylinders by the use of a mixing unit upstream of the intake manifolds of the engine. This mixing unit thus allows the supply of fresh air inside deactivated engine cylinders to be cut off during a regeneration operating mode while maintaining a supply of a mix of fresh air and exhaust gas inside all engine cylinders during a normal operating mode. This mixing unit has the advantage relative to the prior art solutions to maintain a relatively simple structure for the engine and to have a lower impact on the dimensions of the whole system.

According to a further aspect of the invention, the object is achieved by a vehicle according to claim 13.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
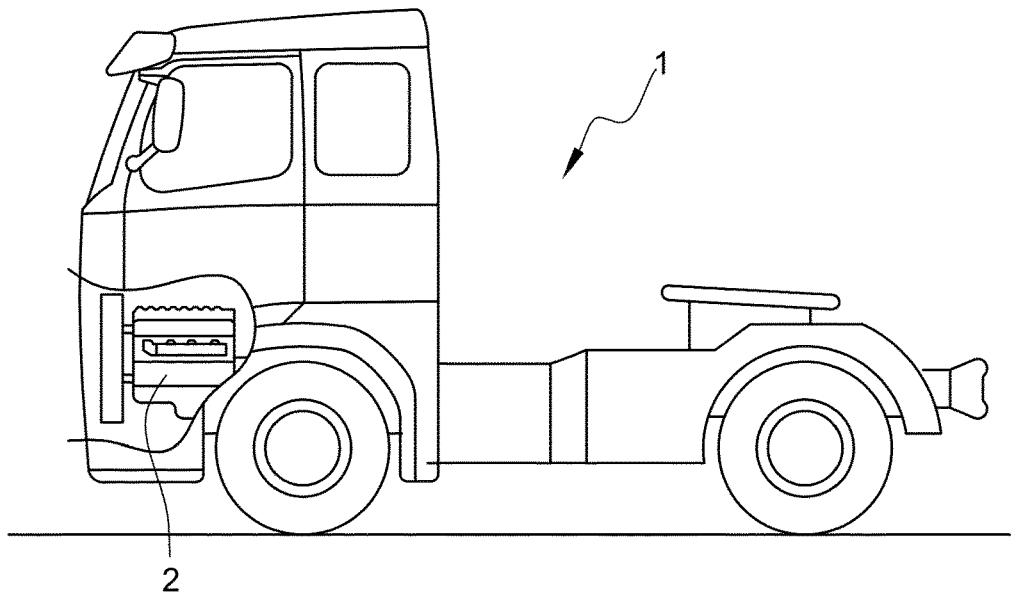
FIG. 1 is a side view of a truck comprising an internal combustion engine.

FIG. 1 shows a vehicle 1 in the form of a truck in a partly cut side view. The vehicle 1 has an internal combustion engine 2 for the propulsion of the vehicle.

Figure 2:
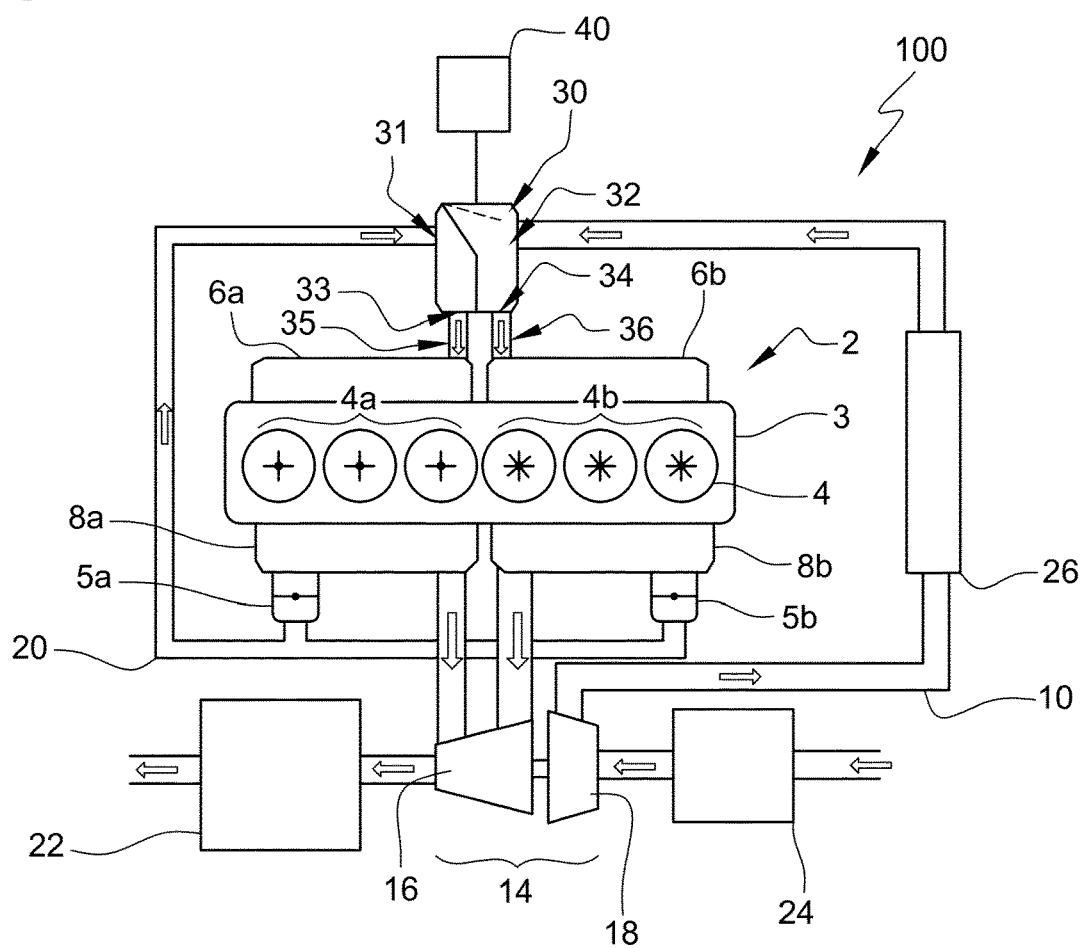
FIG. 2 is a schematic view of an internal combustion engine system according to the invention, belonging to the vehicle of FIG. 1.

In reference to FIG. 2, an internal combustion engine system 100 is shown which is used in the vehicle of FIG. 1 or in any other vehicle comprising an internal combustion engine. The system 100 comprises an internal combustion engine 2 with a cylinder block 3 having a plurality of cylinders 4, e.g. six cylinders in an inline configuration. The cylinders 4 are divided into a first group of cylinders 4a and a second group of cylinders 4b. In the example shown, there are three cylinders 4 in the first group of cylinders 4a and three cylinders 4 in the second group of cylinders 4b. It should be noted that the invention is equally applicable to engines with a different number of cylinder, e.g. two, three, seven, etc. Also, the number of cylinders in the first and second groups of cylinders 4a, 4b may be mutually different. In addition, the cylinder may have a configuration which different from an inline configuration, e.g. a V-configuration.

Furthermore, the internal combustion engine 2 has a first intake manifold 6a for providing gas to the first group of cylinders 4a and a second intake manifold 6b for providing gas to the second group of cylinders 4b. The internal combustion engine 2 has also a first exhaust manifold 8a for receiving the exhaust gas emitted from the first group of cylinders 4a and a second exhaust manifold 8b for receiving the exhaust gas emitted from the second group of cylinders 4b. In an alternative embodiment (not shown), the first and second exhaust manifolds 8a, 8b may jointly form a single exhaust manifold.

A part of the exhaust gas are led to a turbocharger 14 comprising a turbine 16 and an air compressor 18 and onward to an exhaust gas aftertreatment system 22. The turbocharger 14 can be used for the compression of the fresh air that is supplied to the first and second intake manifolds 6a, 6b through an air inlet line 10 and via a mixing unit 30 which will be detailed in the following paragraphs. The fresh air may be filtered in an air filter 24 before its compression, and may be cooled in a charged air cooler 26 after its compression.

The exhaust gas aftertreatment system 22 usually comprises a plurality of exhaust gas aftertreatment units, such as e.g. a diesel oxidation catalyst, a particulate filter and a selective catalytic reactor (SCR).

A SCR unit is a means for converting nitrogen oxides by means of a catalyst into nitrogen and water. An optimal temperature range for these reactions is typically between approximately 250° Celsius and approximately 450° Celsius. This optimal operating temperature can be easily kept during normal (driving) operation modes of the engine.

However, during idle or motoring engine operation modes of the internal combustion engine 2, the temperature of the exhaust gas drops. The reason for that is that fresh air at ambient temperature is fed to the intake manifolds 6a, 6b, even if combustion is reduced considerably (as in the idle engine operation mode) or no combustion takes place at all (as in the motoring engine operation mode). This in turn means that the internal combustion engine 2 is simply pumping fresh and cool air to the exhaust manifolds 8a, 8b and onward into the exhaust gas aftertreatment system 22. This cool air causes the exhaust gas aftertreatment system 22 to cool down rapidly below its optimal operating temperature, which in turn results in poor or no exhaust gas purification, so that the required emission levels cannot be achieved.

For increasing the temperature of the exhaust gas streaming through the exhaust gas aftertreatment system 22, it is proposed in the present invention to operate the system 100 in a regeneration operating mode during which the cylinders 4 of the first group of cylinders 4a are controlled to be inactive, that means no fuel is injected into the cylinders 4 of the first group of cylinders 4a, and during which the cylinders 4 of the second group of cylinders 4b in contrast are controlled to be active. That means the load required for operating the engine in the regeneration operating mode is only provided by the second group of cylinders 4b. That in turn means that the exhaust gas from the second group of cylinders 4b has a significantly higher temperature than the exhaust gas from the first group of cylinders 4a, which in turn increases the overall temperature of the whole exhaust gas.

Furthermore, the system 100 comprises an EGR line 20 which is branched off at the first exhaust manifold 8a, respectively the second exhaust manifold 8b, said EGR line 20 being fluidly connected to the mixing unit 30. The EGR line 20 is thus adapted to supply the mixing unit 30 with recirculated exhaust gas generated by the internal combustion engine 2. A first EGR valve 5a, respectively a second EGR valve 5b, arranged downstream to the first exhaust manifold 8a, respectively to the second exhaust manifold 8b, may advantageously be provided for regulating the amount of recirculated exhaust gas that is supplied to the EGR line 20.

The mixing unit 30 comprises a first inlet 31 fluidly connected to the EGR line 20, a second inlet 32 fluidly connected to the air inlet line 10, a first outlet 33 fluidly connected to the first intake manifold 6a via a first pipe 35 and a second outlet 34 fluidly connected to the second intake manifold 6b via a second pipe 36. The mixing unit 30 is adapted to control the flow of fresh air and exhaust gas supplied to the first and second intake manifolds 6a, 6b by the air inlet and EGR lines 10, 20. In particular, in the regeneration operating mode of the system 100, the mixing unit 30 is adapted to prevent a flow of fresh air to the first intake manifold 6a and a flow of exhaust gas to the second intake manifold 6b while allowing a flow of exhaust gas to the first intake manifold 6a and a flow of fresh air to the second intake manifold 6b. This corresponds to a closed configuration of the mixing unit 30. On the contrary, in the normal operating mode of the system 100, the mixing unit 30 is adapted to allow a flow of a mix of fresh air and exhaust gas to both the first and second intake manifolds 6a, 6b. This corresponds to a fully opened configuration of the mixing unit 30. Furthermore, in a partially opened configuration of the mixing unit 30, the mixing unit 30 may prevent a flow of fresh air to the first intake manifold 6a but may allow a flow of exhaust gas to both the first and second intake manifolds 6a, 6b. The system 100 may advantageously comprise a controller 40 for controlling the opening, the closing and/or the partial opening of the mixing unit 30 depending on the operating mode of the system 100.

Figure 3:
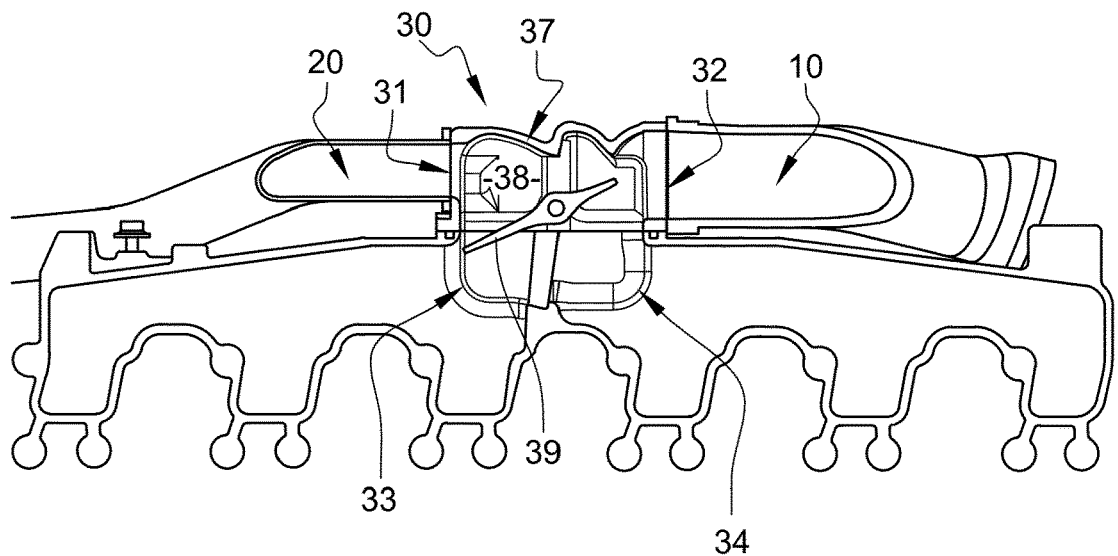
FIG. 3 is a cross-sectional perspective view of the upper portion of the internal combustion engine system shown in FIG. 2 in a first embodiment of the invention.
Figure 4A:
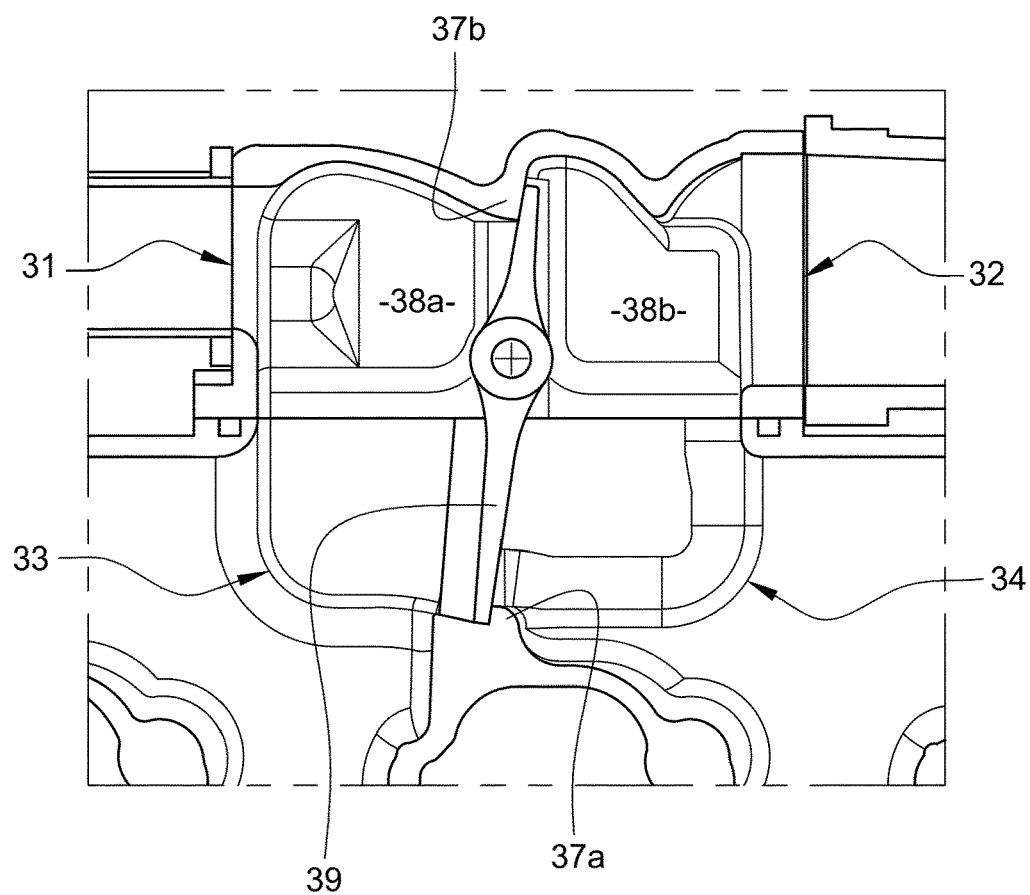
FIG. 4a is an enlarged view of the mixing unit of the internal combustion engine system shown in FIG. 3, the mixing unit being in a closed configuration.

FIG. 3 illustrates the upper portion of the internal combustion engine system 100 shown in FIG. 2 in a first embodiment of the invention. In this embodiment, and as best shown in FIG. 4d, the mixing unit 30 consists in a four-way valve comprising a housing 37 defining an internal chamber 38. The internal chamber 38 having a first portion 38a in fluid communication with the first inlet 31 and the first outlet 33 of the four-way valve 30 and a second portion 38b in fluid communication with the second inlet 32 and the second outlet 34 of the four-way valve 30, the first and second portions 38a, 38b being separated by a central opening 38c. The four-way valve 30 further comprises a flap 39 having a substantially flat shape, and comprising a bottom end 39a and a top end 39b. The flap 39 is pivotally connected to the housing 37 around a pivot axis 39c that is substantially aligned with the central opening 38c. The length of the flap 39 is greater than the width of the central opening 38c. Thus, as illustrated in FIG. 4a, when the bottom and top ends 39a, 39b of the flap 39 are substantially aligned with the central opening 38c, the flap 39 abuts against a bottom abutment surface 37a and a top abutment surface 37b defined by the housing 37 and closes the central opening 38c. In this closed configuration of the valve 30, the fresh air supplied by the air inlet line 10 is guided through the second group of cylinders 4b only. The intake of fresh air for the first group of cylinders 4a is thus controlled to be zero or almost zero. In the same time, the entire flow of exhaust gas supplied by the EGR line 20 is guided through the first group of cylinders 4a only. This closed configuration of the valve 30 will thus lead to an increase of the overall temperature of the whole exhaust gas when the cylinders 4 of the first group of cylinders 4a are controlled to be inactive and the cylinders 4 of the second group of cylinders 4b are controlled to be active.

Figure 4B:
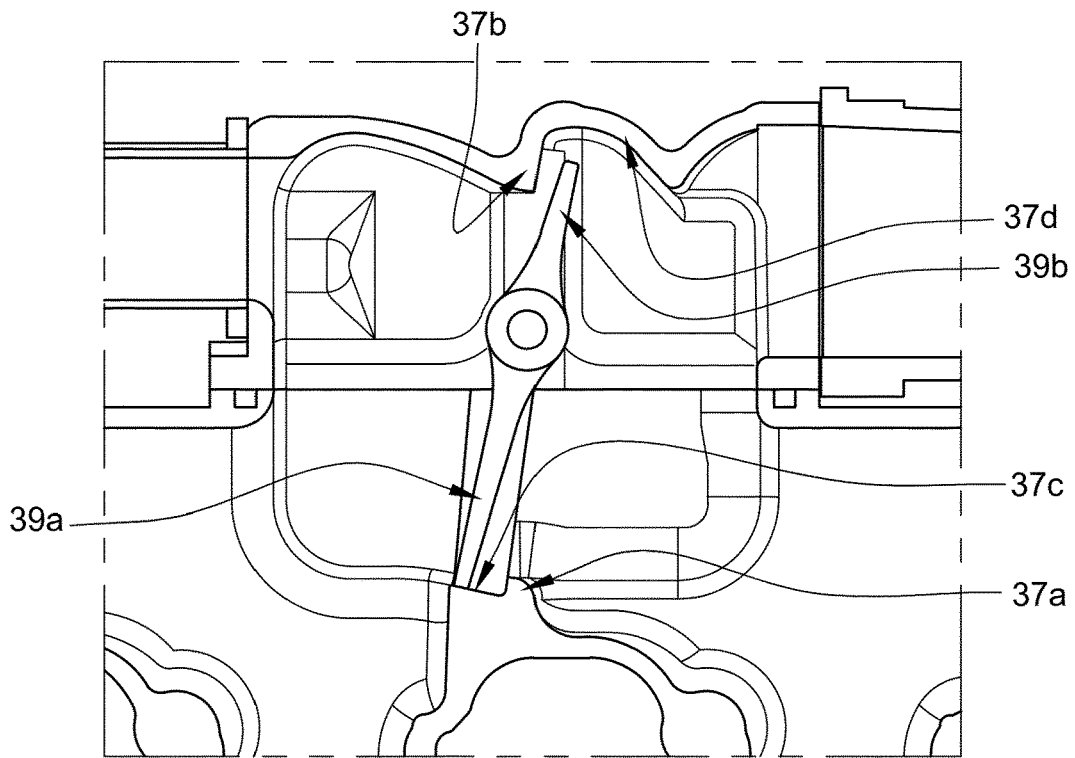
FIG. 4b is a view similar to FIG. 4a, the mixing unit being in a first partially opened configuration.
Figure 4C:
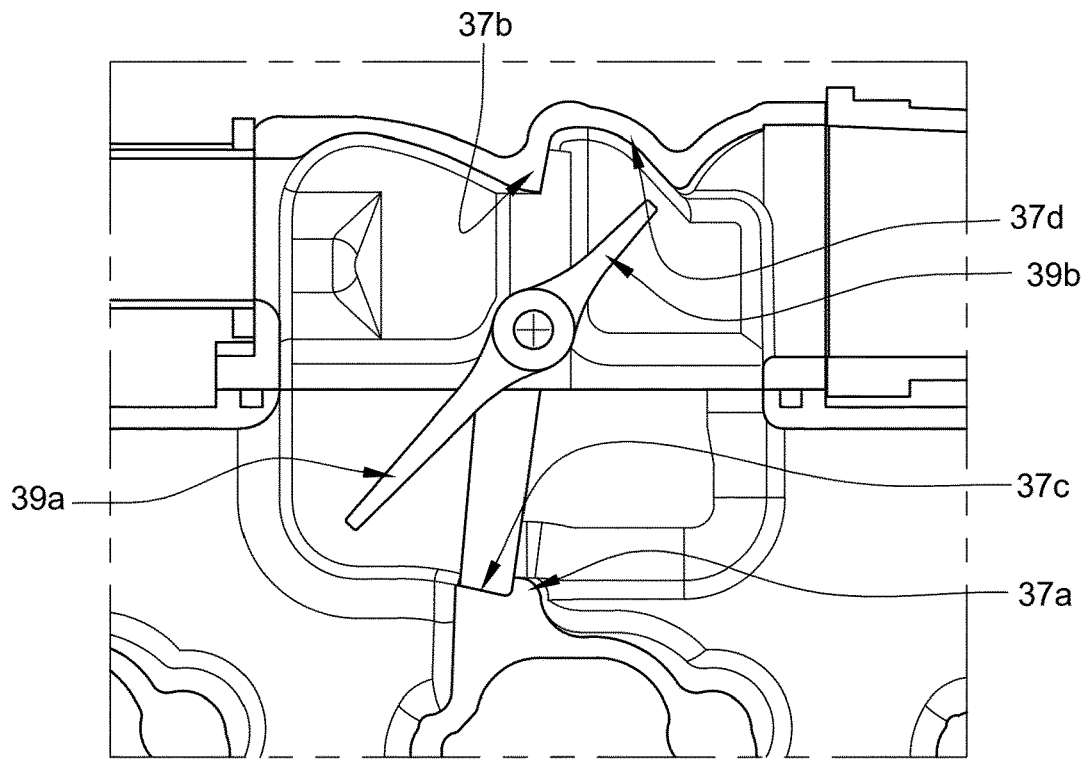
FIG. 4c is a view similar to FIG. 4a, the mixing unit being in a second partially opened configuration.
Figure 4D:
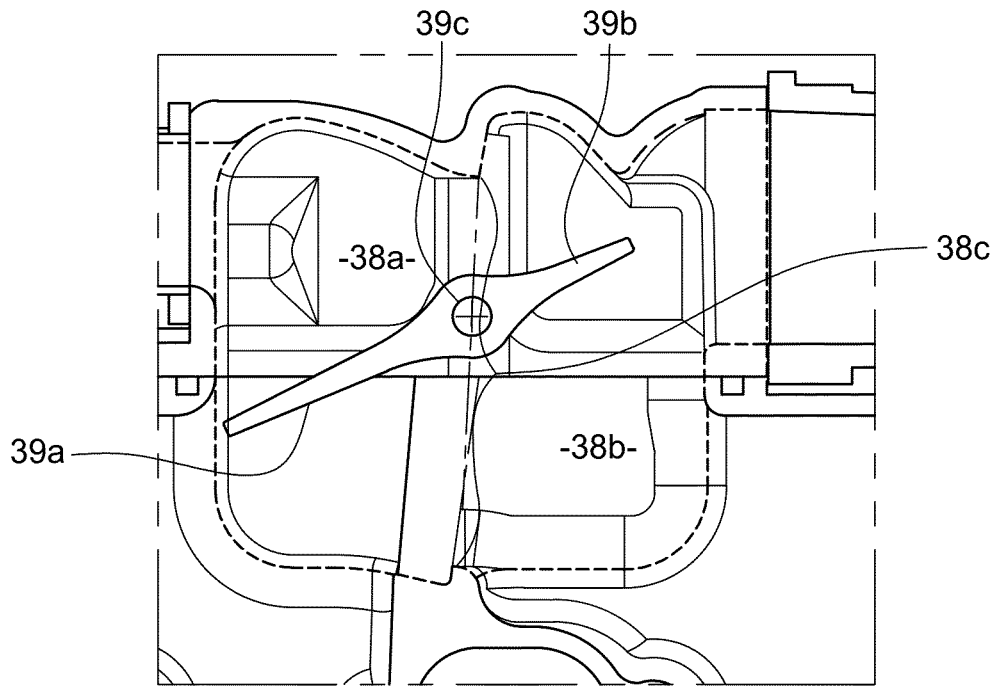
FIG. 4d is a view similar to FIG. 4a, the mixing unit being in a full opened configuration.

In reference to FIG. 4b, it is illustrated a first partially opened configuration of the valve 30, in which the flap 39 is an intermediate position between its position shown in FIG. 4a and its position shown in FIG. 4d. In this position, the bottom and top ends 39a, 39b of the flap 39 are close to the bottom and top abutment surfaces 37a, 37b but without contacting them. Furthermore, the bottom end 39a is sealingly in contact with a bottom internal surface 37c of the housing 37. This bottom internal surface 37c substantially defines an hemi cylindrical part centered on the pivot axis 39c, the distance between said surface 37c and said pivot axis 39c being substantially equal to the length of the bottom end 39a. This sealed contact thus prevents a flow of gas between the first and second portions 38a, 38b in the bottom part of the internal chamber 38. In the same time, the top end 39b is sufficiently distant from a top internal surface 37d to allow a flow of gas between the first and second portions 38a, 38b in a top part of the internal chamber 38. This first partially opened configuration of the valve 30 will thus lead to guide a small flow of exhaust gas through the second group of cylinders 4b, while preventing a flow of fresh air through the first group of cylinders 4a.

In reference to FIG. 4c, it is illustrated a second partially opened configuration of the valve 30, in which the flap 39 is an intermediate position between its position shown in FIG. 4b and its position shown in FIG. 4d. In this position, the bottom and top ends 39a, 39b of the flap 39 are sufficiently distant from the bottom and top abutment surfaces 37a, 37b and from the bottom and top internal surfaces 37c, 37d to allow a small flow of gas between the first and second portions 38a, 38b in both bottom and top parts of the internal chamber 38. This second partially opened configuration of the valve 30 will thus lead to guide a small flow of exhaust gas through the second group of cylinders 4b, while also allowing a small flow of fresh air through the first group of cylinders 4a.

In reference to FIG. 4d, it is illustrated the fully opened configuration of the valve 30. In this configuration, the bottom and top ends 39a, 39b of the flap 39 are sufficiently distant from the bottom and top abutment surfaces 37a, 37b and from the bottom and top internal surfaces 37c, 37d to allow a non-restricted flow of gas between the first and second portions 38a, 38b in both bottom and top parts of the internal chamber 38. This configuration of the valve 30 corresponds to the normal operating mode of the system 100 in which a mix of exhaust gas and fresh air is supplied to the cylinders 4 of the first and second groups of cylinders 4a, 4b.

Figure 5:
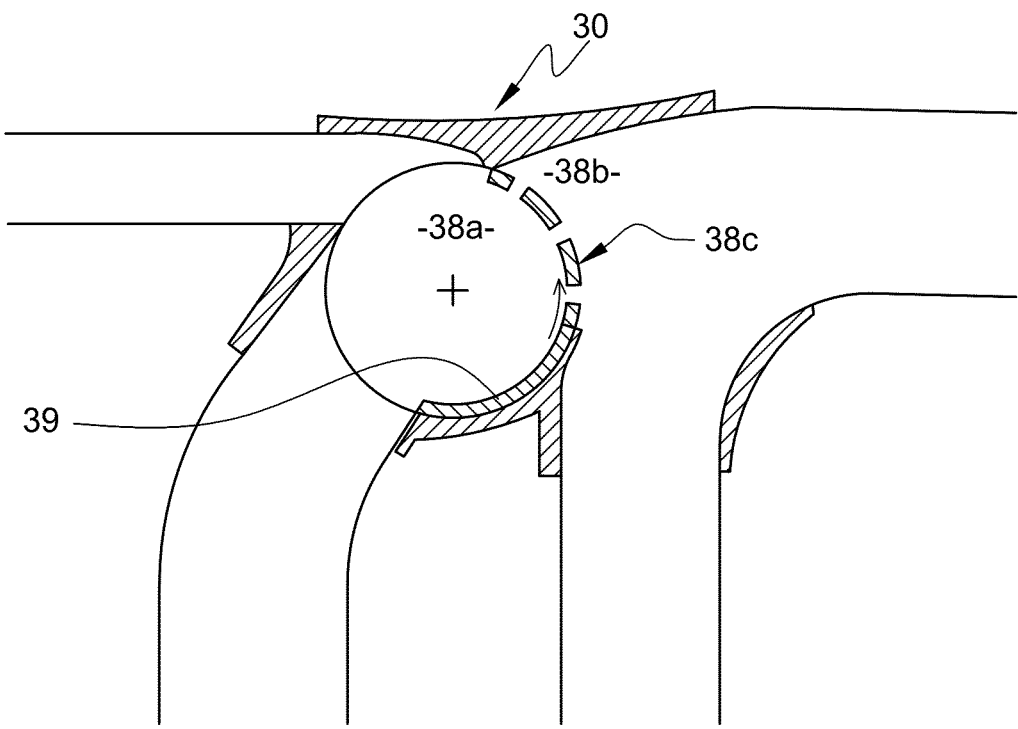
FIG. 5 is a cross-sectional view of the mixing unit of the internal combustion engine system shown in FIG. 2 in a second embodiment of the invention.

In reference to FIG. 5, it is illustrated an alternative embodiment of the four-way valve 30. In this embodiment, the first and second portions 38a, 38b of the internal chamber 38 are separated by a hemi-cylindrical central opening 38c. The closure element 39, that plays the same role as the flap of the embodiment of FIG. 3, comprises an hemi-cylindrical wall having substantially the same shape as the central opening 38c, said wall being rotatably movable in the internal chamber 38 between a first position, shown in dashed lines, in which it is angularly aligned with the central opening 38c to close it, and a second position, shown in solid lines, in which it is angularly offset from the central opening 38c to completely open it. The first position of the closure element 39 corresponds to the closed configuration of the valve 30 and the second position of the closure element 39 corresponds to the fully opened configuration of the valve 30. The closure element 39 may advantageously be disposed in an intermediate position (not shown) between said first and second positions, in which it is slightly angularly offset from the central opening 38c to partially open it. This intermediate position corresponds to a partially opened configuration of the valve 30.

It is to be understood that the present invention is not limited to the embodiments described above and illustrated in the drawings; rather, the skilled person will recognize that many changes and modifications may be made within the scope of the appended claims.

The invention claimed is:

1. Internal combustion engine system, comprising: an internal combustion engine comprising a cylinder block housing a plurality of cylinders, a first intake manifold connected to a first group of cylinders, a second distinct intake manifold connected to a second group of cylinders and a first, respectively a second, exhaust manifold for receiving the exhaust gas emitted from the first, respectively the second, group of cylinders; an air inlet line; an EGR line connected to the first and second exhaust manifolds; wherein the internal combustion engine system is operable in at least two operating modes, respectively a normal operating mode in which all cylinders are supplied with fuel and a regeneration operating mode, in which the cylinders of the first group of cylinders are no longer supplied with fuel, characterized in that: the system also includes a mixing unit comprising a four-way valve, said four-way valve having a first inlet connected to the EGR line, a second inlet connected to the air inlet line, a first outlet connected to the first intake manifold and a second outlet connected to the second intake manifold; the four-way valve is designed so that, in said normal operating mode, the intake gases supplied to the first intake manifold and to the second intake manifold have approximately the same proportion of exhaust gas and so that, in said regeneration operating mode, the intake gas supplied to the first intake manifold only includes exhaust gas.

2. The system according to claim 1, characterized in that the four-way valve is controlled so that, in said regeneration operating mode, the intake gas supplied to the second intake manifold includes only fresh air or a mixture of fresh air and exhaust gas.

3. The system according to claim 1, characterized in that the four-way valve comprises a housing defining an internal chamber, the internal chamber having a first portion in fluid communication with the first inlet and the first outlet of the four-way valve and a second portion in fluid communication with the second inlet and the second outlet of the four-way valve, the first and second portions being separated by a central opening, the central opening being selectively closed by a closure element.

4. The system according to claim 3, characterized in that the closure element comprises a flap that is rotatably movable inside the internal chamber.

5. The system according to claim 4, characterized in that the flap has a bottom end and a top end, said flap being rotatably movable between a first position in which its bottom end, respectively its top end, abuts against a bottom abutment surface respectively a top abutment surface, defined by the housing and in which it closes the central opening, a second position in which its bottom and top ends are far from the bottom and top abutment surfaces and in which it completely opens the central opening, and preferably an intermediate position between the first and second positions in which its bottom and top ends are close to said bottom and top abutment surfaces and in which it opens the central opening in a top part thereof that is close to the top abutment surface while closing said central opening in a bottom part thereof that is close to the bottom abutment surface.

6. The system according to claim 5, characterized in that, in the intermediate position of the flap, its bottom end is sealingly in contact with a bottom internal surface of the housing, thus preventing a flow of gas between the first and second portions of the internal chamber through the central opening in a bottom part thereof, and its top end is distant from a top internal surface of the housing, thus allowing a flow of gas between said first and second portions through the central opening in a top part thereof.

7. The system according to claim 3, characterized in that the closure element comprises a hemi-cylindrical wall having substantially the same shape as the central opening, said wall being rotatably movable inside the internal chamber.

8. The system according to claim 7, characterized in that the closure element is movable between a first position, in which it is angularly aligned with the central opening to close it, a second position, in which it is angularly offset from the central opening to completely open it, and preferably an intermediate position between the first and second positions in which it is slightly angularly offset from the central opening to partially open it.

9. The system according to claim 1, characterized in that it further comprises a controller for controlling the opening, the closing and/or the partial opening of the four-way valve.

10. The system according to claim 1, characterized in that an EGR valve is arranged downstream of the first, respectively the second, exhaust manifold on the path of exhaust gas flowing towards the EGR line, said EGR valves controlling the flow of exhaust gas through the EGR line.

11. The system according to claim 1, characterized in that the first and second exhaust manifolds jointly form a single exhaust manifold.

12. The system according to claim 1, characterized in that the system includes a turbocharger comprising an air compressor and a turbine for driving said compressor, the turbine being arranged to be driven by exhaust gas flowing from the first and second exhaust manifolds to an exhaust after treatment system, the air compressor being arranged to supply compressed air to the air inlet line.

13. Vehicle comprising an internal combustion engine system according to claim 1.

* * * * *